United States Patent
Park et al.

(10) Patent No.: US 10,846,872 B2
(45) Date of Patent: Nov. 24, 2020

(54) ELECTRONIC DEVICE AND METHOD OF CALCULATING ANGLE OF IMPACT OF SPATTER STAIN

(71) Applicant: Republic of Korea (National Forensic Service Director Ministry of Public Administration and Security), Seoul (KR)

(72) Inventors: Nam Kyu Park, Bucheon-si (KR); Jae Mo Goh, Wonju-si (KR); Jin Pyo Kim, Yuseong-gu (KR); Young Il Seo, Wonju-si (KR); Eun Ah Joo, Yongin-si (KR); Je Hyun Lee, Wonju-si (KR); Sang Yoon Lee, Siheung-si (KR); Dong A Lim, Yuseong-gu (KR)

(73) Assignee: Republic of Korea (National Forensic Service Director Ministry of Public Administration and Security), Seoul (KR)

( * ) Notice: Subject to any disclaimer, the term of this patent is extended or adjusted under 35 U.S.C. 154(b) by 103 days.

(21) Appl. No.: 16/175,614

(22) Filed: Oct. 30, 2018

(65) Prior Publication Data

US 2019/0370991 A1 Dec. 5, 2019

(30) Foreign Application Priority Data

May 29, 2018 (KR) .......................... 10-2018-0061308

(51) Int. Cl.
*G06T 7/60* (2017.01)
*G01B 11/26* (2006.01)

(52) U.S. Cl.
CPC ............... *G06T 7/60* (2013.01); *G01B 11/26* (2013.01)

(58) Field of Classification Search
CPC .................................. G06T 7/60; G01B 11/26
See application file for complete search history.

(56) References Cited

U.S. PATENT DOCUMENTS

| 8,750,952 | B2* | 6/2014 | Aalders | ............... | A61B 5/0059 |
| | | | | | 600/310 |
| 2006/0182314 | A1* | 8/2006 | England | ............... | G01C 15/002 |
| | | | | | 382/106 |

(Continued)

FOREIGN PATENT DOCUMENTS

| KR | 10-2015-0133500 A | 11/2015 |
| KR | 10-1588323 B1 | 1/2016 |
| KR | 10-1812089 B1 | 12/2017 |

OTHER PUBLICATIONS

Forensic Science International. An image-processing methodology for extracting bloodstain pattern features. Year—Jun. 2017. Ravishka M. Arthura,*, Philomena J. Humburgb, Jerry Hoogenboomc, Martin Baikerc, Michael C. Taylord, Karla G. de Bruinc.*

(Continued)

*Primary Examiner* — Md K Talukder
(74) *Attorney, Agent, or Firm* — Schwegman Lundberg & Woessner, P.A.

(57) ABSTRACT

According to the present disclosure, a method of calculating an angle of impact of a bloodstain is performed by a device for calculating an angle of impact of a bloodstain and includes obtaining a captured image of an analysis target by using a camera, extracting a spatter stain included in the analysis target, by analyzing the obtained captured image, calculating a major axis length and a minor axis length of the spatter stain, estimating an angle of impact of the spatter stain by using the major axis length and the minor axis length of the spatter stain, and outputting the spatter stain and the angle of impact of the spatter stain.

14 Claims, 10 Drawing Sheets

(56) References Cited

U.S. PATENT DOCUMENTS

| | | | | |
|---|---|---|---|---|
| 2012/0155739 A1* | 6/2012 | Schlarb | ............... | G06K 9/0014 |
| | | | | 382/134 |
| 2015/0117745 A1* | 4/2015 | Vapa | ........................ | G06K 9/34 |
| | | | | 382/134 |
| 2015/0348261 A1* | 12/2015 | Sunami | ..................... | G06T 5/50 |
| | | | | 382/131 |
| 2017/0150904 A1* | 6/2017 | Park | ...................... | G06T 7/0012 |
| 2019/0003955 A1* | 1/2019 | Seo | ........................ | G01N 21/01 |
| 2019/0369082 A1* | 12/2019 | Park | ....................... | G01N 33/49 |
| 2019/0370991 A1* | 12/2019 | Park | .......................... | G06T 7/60 |

OTHER PUBLICATIONS

Korean Application No. 10-2018-0061308, Office Action dated Oct. 4, 2018, 5 pgs.

Lim, S., et al., "A study on the optimization of impact angle formation of spatter stains", Korean Journal of Forensic Sciences, 18, with English abstract, (2017), 67-70.

\* cited by examiner

ELECTRONIC DEVICE AND METHOD OF CALCULATING ANGLE OF IMPACT OF SPATTER STAIN

CROSS-REFERENCE TO RELATED APPLICATION

This application claims the benefit of Korean Patent Application No. 10-2018-0061308, filed on May 29, 2018, in the Korean Intellectual Property Office, the disclosure of which is incorporated herein in its entirety by reference.

BACKGROUND

1. Field

One or more embodiments relate to an electronic device and a method of calculating an angle of impact of a spatter stain.

2. Description of the Related Art

A spatter stain formed when blood is spattered at a bloody crime scene plays an important role in deducing a hitting or striking action because an angle of impact thereof may be calculated and used to estimate an area of origin or the like. The angle of impact of the spatter stain may be determined based on a geometric shape (e.g., a ratio of a minor axis to a major axis of an elliptical shape) of a bloodstain. Currently, since the angle of impact is directly measured with the eyes on the spot by using a loupe or the like, accurate and rapid calculation of the angle of impact may not be easily achieved.

Therefore, a program capable of easily calculating an angle of impact of a spatter stain on the spot is necessary.

SUMMARY

One or more embodiments include an electronic device for calculating an angle of impact of a spatter stain, a method of calculating an angle of impact of a spatter stain, and a computer program recorded on a recording medium to execute the method.

Additional aspects will be set forth in part in the description which follows and, in part, will be apparent from the description, or may be learned by practice of the presented embodiments.

According to one or more embodiments, a method of calculating an angle of impact of a bloodstain is performed by a device for calculating an angle of impact of a bloodstain, and includes obtaining a captured image of an analysis target by using a camera, extracting a spatter stain included in the analysis target, by analyzing the obtained captured image, calculating a major axis length and a minor axis length of the spatter stain, estimating an angle of impact of the spatter stain by using the major axis length and the minor axis length of the spatter stain, and outputting the spatter stain and the angle of impact of the spatter stain.

The calculating of the major axis length and the minor axis length of the spatter stain may include generating a guide line surrounding the spatter stain and having an elliptical shape, and calculating a major axis length and a minor axis length of the guide line and mapping the major axis length and the minor axis length of the guide line to the major axis length and the minor axis length of the spatter stain.

The guide line surrounding the spatter stain and having an elliptical shape may be output through an output unit, and may be adjusted in location, size, or shape based on a user input.

The estimating of the angle of impact of the spatter stain may include calculating a ratio k of the major axis length to the minor axis length of the spatter stain, and calculating the angle of impact of the spatter stain by using the ratio k and a pre-registered equation.

The estimating of the angle of impact of the spatter stain may include calculating a ratio k of the major axis length to the minor axis length of the spatter stain, determining an equation to be applied, considering a type of a surface on which the spatter stain is located, and calculating the angle of impact of the spatter stain by using the ratio k and the equation.

An angle a of impact of the spatter stain may be calculated using an equation, $K=1.590 \sin(0.009517 a-0.02877)$ when the surface on which the spatter stain is located is paper.

An angle a of impact of the spatter stain may be calculated using an equation, $K=0.9145 \sin(0.02619 a+0.6478) + 0.5629 \sin(0.04441 a+3.9020)$ when the surface on which the spatter stain is located is wallpaper.

The device for calculating an angle of impact of a bloodstain may include a first button used to obtain the captured image, and a second button used to calculate the angle of impact of the spatter stain.

The obtaining of the captured image of the analysis target may include obtaining a captured image from an external imaging device.

The method may further include transmitting the captured image and the angle of impact of the spatter stain to an external device, after the angle of impact of the spatter stain is estimated.

According to one or more embodiments, an electronic device includes a camera, an input unit, an output unit, a processor, and a storage medium having stored therein instructions executable by the processor, wherein the processor executes the instructions and includes an image obtainer configured to obtain a captured image of an analysis target by using the camera, a bloodstain image extractor configured to extract a spatter stain included in the analysis target, by analyzing the obtained captured image, a length calculator configured to calculate a major axis length and a minor axis length of the spatter stain, an angle estimator configured to estimate an angle of impact of the spatter stain by using the major axis length and the minor axis length of the spatter stain, and an output controller configured to control the spatter stain and the angle of impact of the spatter stain to be output through the output unit.

The length calculator may be further configured to generate a guide line surrounding the spatter stain and having an elliptical shape, calculate a major axis length and a minor axis length of the guide line, and map the major axis length and the minor axis length of the guide line to the major axis length and the minor axis length of the spatter stain.

The guide line surrounding the spatter stain and having an elliptical shape may be output through the output unit, and may be adjusted in location, size, or shape based on a user input received through the input unit.

The angle estimator may be further configured to calculate a ratio k of the major axis length to the minor axis length of the spatter stain, and calculate the angle of impact of the spatter stain by using the ratio k and a pre-registered equation.

The angle estimator may be further configured to calculate a ratio k of the major axis length to the minor axis length of the spatter stain, determine an equation to be applied, considering a type of a surface on which the spatter stain is located, and calculate the angle of impact of the spatter stain by using the ratio k and the equation.

The angle estimator may be further configured to calculate an angle a of impact of the spatter stain by using an equation, K=1.590 sin(0.009517 a−0.02877) when the surface on which the spatter stain is located is paper The angle estimator may be further configured to calculate an angle a of impact of the spatter stain by using an equation, K=0.9145 sin (0.02619 a+0.6478)+0.5629 sin (0.04441 a+3.9020) when the surface on which the spatter stain is located is wallpaper.

The electronic device may include a first button used to obtain the captured image, and a second button used to calculate the angle of impact of the spatter stain.

The image obtainer may be further configured to obtain a captured image from an external imaging device.

The electronic device may further include a communication unit configured to transmit the captured image and the angle of impact of the spatter stain to an external device.

According to one or more embodiments, a computer program is recorded on a recording medium to execute a method of calculating an angle of impact of a bloodstain.

According to one or more embodiments, other methods and other systems for implementing the present disclosure, and computer-readable recording media having recorded thereon computer programs for executing the methods are further provided.

Additional aspects, features, and advantages of the present disclosure will become apparent from the following detailed description, the accompanying drawings, and the appended claims.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
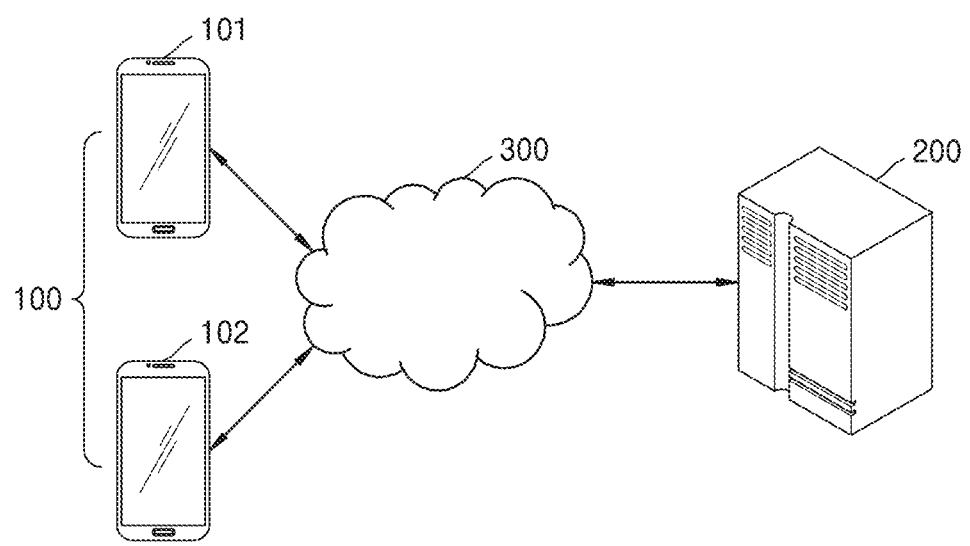
FIG. 1 is a schematic diagram of a bloodstain analysis system according to an embodiment of the present disclosure.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

In this specification, a spatter stain refers to a stain of a blood droplet which does not vertically fall and hits a surface at an angle within 90° due to an artificial force other than gravity.

FIG. 1 is a schematic diagram of a bloodstain analysis system according to an embodiment of the present disclosure.

Referring to FIG. 1, the bloodstain analysis system according to an embodiment of the present disclosure includes a server 200, an electronic device 100, and a network 300 configured to connect the server 200 to the electronic device 100.

The bloodstain analysis system according to an embodiment of the present disclosure provides a service of calculating an angle of impact of a bloodstain. Specifically, the bloodstain analysis system provided according to an embodiment may upload data obtained by a user based on an experiment or a method of calculating an angle of impact of a bloodstain, which is described below, and share the uploaded data with other users. For example, the user may measure a ratio of a major axis length to a minor axis length of a spatter stain based on an angle of impact and upload data about the measured angle. When the data is uploaded by the user, the bloodstain analysis system according to an embodiment registers the data in the server 200 and provides an interface configured to allow other users to check the data registered in the server 200. As such, the bloodstain analysis system according to an embodiment may build a database about the ratio of a major axis length to a minor axis length of a spatter stain based on an angle of impact.

The electronic device 100 refers to a communication device capable of using a web service in a wired or wireless communication environment and including a camera and a touchscreen. Herein, the electronic device 100 may be a portable device 101 or 102 of the user. Although FIG. 1 illustrates the portable device 101 or 102 as a smartphone, the scope of the present disclosure is not limited thereto, and any portable device including a camera and capable of installing therein an application programmed to execute a bloodstain analysis method provided according to an embodiment of the present disclosure may be used.

The electronic device 100 further includes an output unit configured to display a screen image and an input unit configured to receive data input from the user. The input unit may include, for example, a keyboard, a mouse, a trackball, a microphone, buttons, a touch panel, or the like, but is not limited thereto.

The network 300 connects the electronic device 100 to the server 200. For example, the network 300 provides an access route to the electronic device 100 to access and then transmit or receive packet data to or from the server 200.

Although not shown in FIG. 1, the server 200 according to an embodiment of the present disclosure may include memory, an input/output unit, a program storage, a controller, etc.

Figure 2:
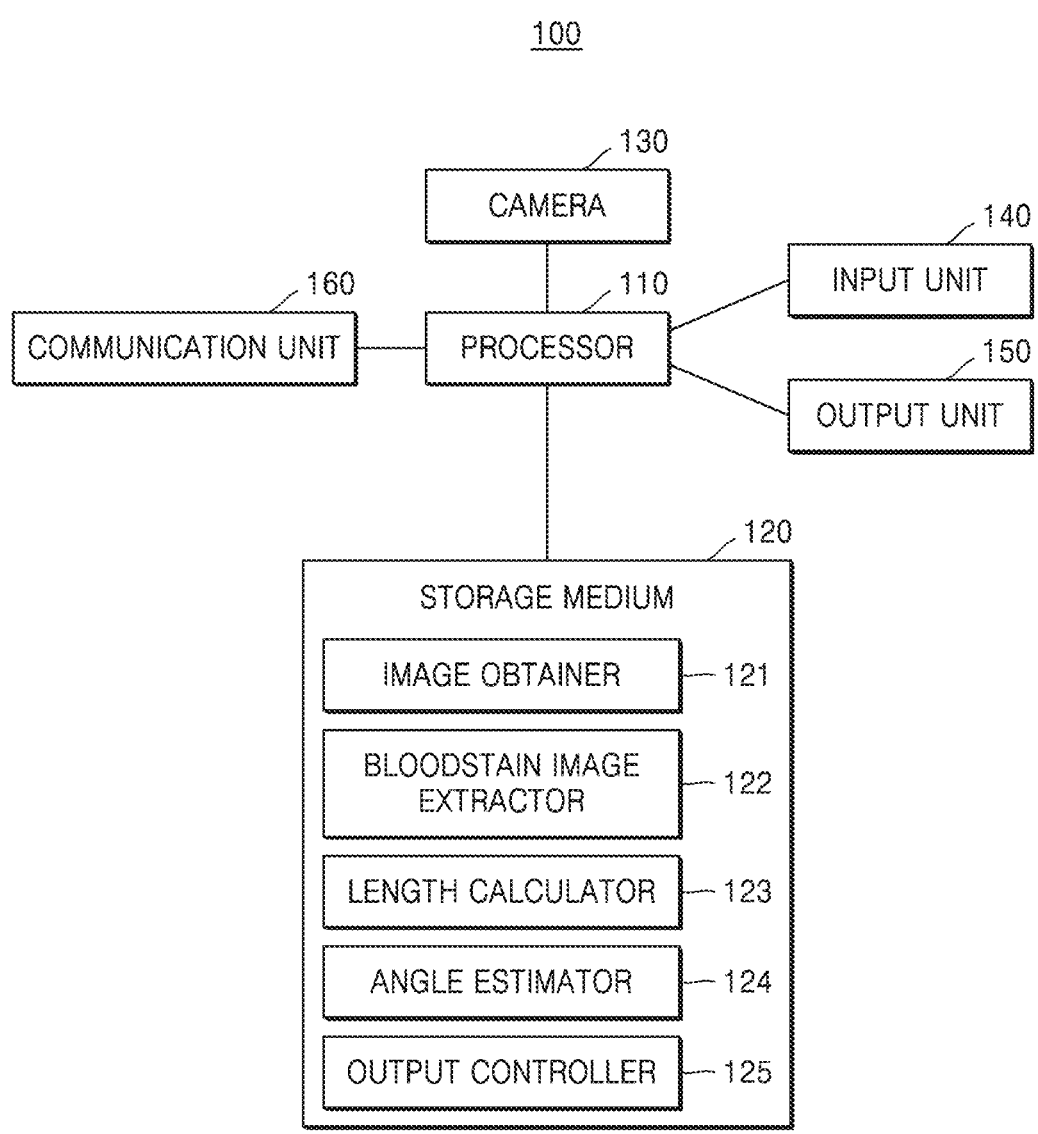
FIG. 2 is a block diagram of an electronic device for calculating an angle of impact of a spatter stain, according to an embodiment of the present disclosure.

FIG. 2 is a block diagram of an electronic device 100 for calculating an angle of impact of a spatter stain, according to an embodiment of the present disclosure.

As illustrated in FIG. 2, the electronic device 100 for calculating an angle of impact of a spatter stain may include a processor 110, a storage medium 120, a camera 130, an input unit 140, an output unit 150, and a communication unit 160 to calculate an angle of impact of a spatter stain by using a captured image of the spatter stain.

At least one processor 110 may be provided. The processor 110 controls general operations of the electronic device 100. For example, the processor 110 may control the camera 130, the input unit 140, the output unit 150, and the communication unit 160 by executing programs stored in the storage medium 120.

The storage medium 120 may store programs for processing and controlling operations of the processor 110 and store input/output data.

The storage medium 120 may include at least one type of storage medium among flash memory, a hard disk, a multimedia card micro, card type memory (e.g., secure digital (SD) or extreme digital (XD) memory), random access memory (RAM), static random access memory (SRAM), read-only memory (ROM), electrically erasable programmable ROM (EEPROM), programmable ROM (PROM), magnetic memory, a magnetic disc, and an optical disc. Alternatively or additionally, the electronic device 100 may use a web storage or a cloud server serving as the storage medium 120 on the Internet.

The programs stored in the storage medium 120 may be classified into a plurality of modules based on functions thereof.

The camera 130 may obtain a still image or an image frame of a video in a capture mode by using an image sensor. The image captured by the image sensor may be processed using the module stored in the storage medium 120.

The image frame processed by the camera 130 may be stored in the storage medium 120 or be transmitted outside through the communication unit 160. Two or more cameras 130 may be provided depending on the configuration of the electronic device 100. The camera 130 may capture an image of an analysis target.

The input unit 140 refers to a means for inputting data by a user to control the electronic device 100. For example, the input unit 140 may include a keypad, a dome switch, a touchpad (e.g., a capacitive overlay type, a resistive overlay type, an infrared beam type, a surface acoustic wave type, an integral strain gauge type, or a piezoelectric type), a jog wheel, a jog switch, or the like, but is not limited thereto.

The output unit 150 outputs data processed by the electronic device 100. For example, the output unit 150 may output a captured image frame of a bloodstain. The output unit 150 may output user interfaces provided by executing the programs stored in the storage medium 120.

The communication unit 160 may include one or more elements configured to enable communication between the electronic device 100 and another external electronic device, a server, or the like.

The storage medium 120 may include an image obtainer 121, a bloodstain image extractor 122, a length calculator 123, an angle estimator 124, and an output controller 125 to calculate an angle of impact of a spatter stain.

The image obtainer 121 obtains the image captured by the camera 130. An analysis target may be a certain region of a crime scene including a spatter stain. The image obtainer 121 may receive a captured image from an external electronic device.

The bloodstain image extractor 122 may extract an image of a spatter stain by analyzing the obtained captured image. The bloodstain image extractor 122 may divide the captured image into images of a spatter stain and a background and extract an image of a spatter stain having characteristics of a spatter stain.

The length calculator 123 calculates a major axis length and a minor axis length of the extracted spatter stain. The length calculator 123 may calculate the longest diameter among one or more lines passing through the center of the spatter stain, as the major axis length. The length calculator 123 may calculate the shortest diameter among one or more lines passing through the center of the spatter stain, as the minor axis length.

In another embodiment, the length calculator 123 may generate a guide line corresponding to a major axis or a minor axis of the spatter stain and calculate the length of the guide line as the length of the major axis or the minor axis. The length calculator 123 may generate a first guide line corresponding to the major axis of the spatter stain and calculate the length of the first guide line as the major axis length of the spatter stain. In addition, the length calculator 123 may generate a second guide line corresponding to the minor axis of the spatter stain and calculate the length of the second guide line as the minor axis length of the spatter stain. The location, length, color, and/or shape of the first or second guide line may be changed based on a user input.

The location of the first or second guide line may be changed from a first point to a second point based on a drag input received through the input unit 140 and moving from the first point to the second point, and a diameter at the second point may be calculated as the major axis length or the minor axis length of the spatter stain.

The angle estimator 124 estimates an angle of impact of the spatter stain by using the major axis length and the minor axis length of the spatter stain. Herein, the angle of impact of the spatter stain refers to an angle between a proceeding direction of blood and a surface when the blood hits the surface.

The angle estimator 124 may calculate the angle of impact of the spatter stain based on a trigonometric function value representing a ratio of the major axis length to the minor axis length of the spatter stain. The angle estimator 124 may differently apply a relational expression between the ratio of the major axis length to the minor axis length of the spatter stain and the angle of impact of the spatter stain, considering the type of the surface.

The angle estimator 124 may estimate the angle of impact of the spatter stain by substituting a ratio value of the major axis length to the minor axis length of the spatter stain, in the following equation.

$$\theta = \arcsin(W/L)$$

Herein, θ denotes the angle of impact, W denotes the minor axis length, and L denotes the major axis length.

The angle estimator 124 may estimate the angle of impact of the spatter stain by using one of the following equations depending on the type of the surface on which the spatter stain is located.

When the spatter stain is located on A4 paper, the angle estimator 124 may estimate the angle of impact of the spatter stain by using the following equations.

$$W/L = K1 * \sin(K2 * \theta - K3)$$

$$\theta = 1/K2 * \{\arcsin(W/(L*K1)) + K3\}$$

Herein, K1, K2, and K3 denote constants. K1 may be a real number equal to or greater than 1.5 and equal to or less than 1.6, K2 may be a real number equal to or greater than 0.0095 and equal to or less than 0.0096, and K3 may be a real number equal to or greater than 0.028 and equal to or less than 0.029. Based on a test calculation, K1 may be 1.590, K2 may be 0.009517, and K3 may be 0.02877.

When the spatter stain is located on wallpaper, the angle estimator 124 may estimate the angle of impact of the spatter stain by using the following equation.

$$W/L = L1 * \sin(L2 * \theta + L3) + L4 * \sin(L5 * \theta + L6)$$

Herein, L1, L2, L3, L4, L5, and L6 denote constants. L1 may be a real number equal to or greater than 0.9 and equal to or less than 1, L2 may be a real number equal to or greater than 0.02 and equal to or less than 0.03, and L3 may be a real number equal to or greater than 0.6 and equal to or less than 0.7. L4 may be a real number equal to or greater than 0.56 and equal to or less than 0.57, L5 may be a real number equal to or greater than 0.04 and equal to or less than 0.05, and L6 may be a real number equal to or greater than 3.9 and equal to or less than 4.0. Based on a test calculation, L1 may be 0.9145, L2 may be 0.02619, L3 may be 0.6478, L4 may be 0.5629, L5 may be 0.04441, and L6 may be 3.9020.

The angle estimator 124 selects an equation depending on the type of the surface and estimates the angle of impact of the spatter stain by using the selected equation.

The output controller 125 controls the estimated angle of impact of the spatter stain to be output through the output unit 150. The output controller 125 may control the angle of impact of the spatter stain to be output together with the image of the spatter stain. The output controller 125 may control a screen image for providing the angle of impact of the spatter stain, to be output through an external electronic device.

The angle of impact estimated according to the current embodiment may be stored in a database together with the image of the spatter stain, the type of the surface, the major axis length, and the minor axis length.

As such, a situation that happened at a crime scene may be deduced using the estimated angle of impact of the spatter stain, and a clue to solving a crime may be found using the deduced situation.

Figure 3:
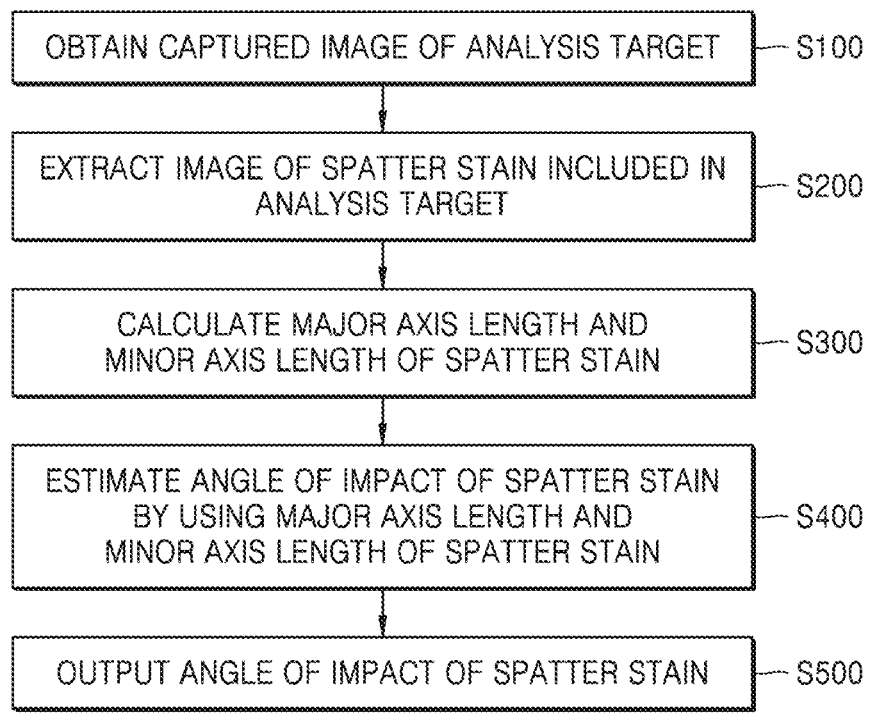
FIGS. 3 to 5 are flowcharts of a method of calculating an angle of impact of a spatter stain, according to embodiments of the present disclosure.
Figure 4:
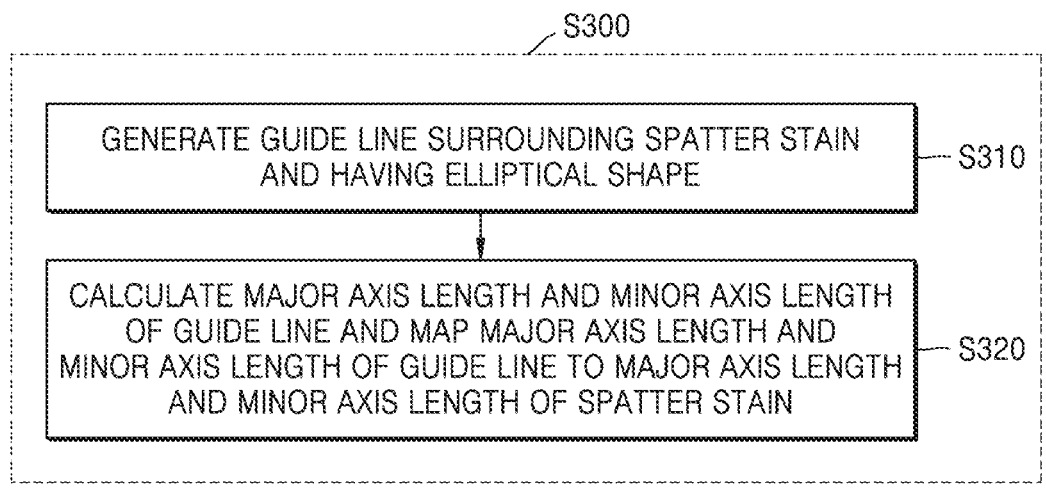
Figure 5:
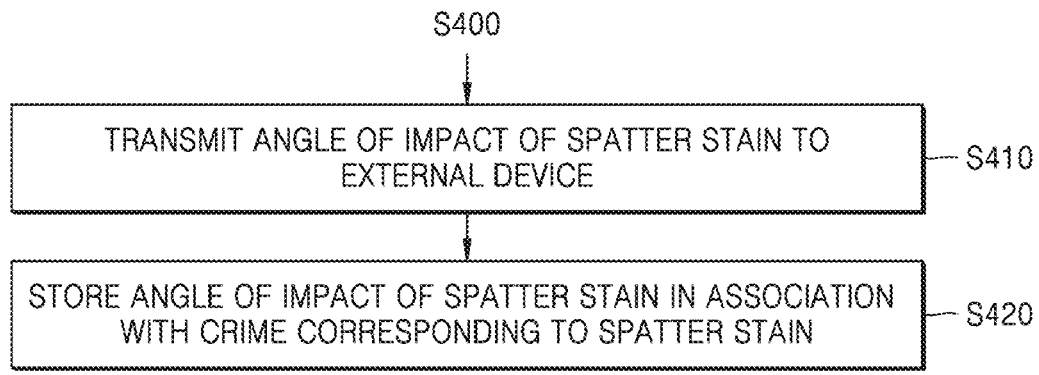

FIGS. 3 to 5 are flowcharts of a method of calculating an angle of impact of a spatter stain, according to embodiments of the present disclosure.

Referring to FIG. 3, initially, the electronic device 100 for calculating an angle of impact of a spatter stain obtains a captured image of an analysis target (S100). In this case, the captured image may be an image of a crime scene which is directly captured by the camera 130, or a previously captured image stored in a storage medium. Alternatively, the captured image may be downloaded and obtained from another electronic device or the server 200 of the bloodstain analysis system.

When an image of a crime scene is directly captured by the camera 130, a user may obtain the captured image by touching a capture button C1 displayed on a screen image A1.

After the captured image is obtained, an image of a spatter stain included in the analysis target is extracted by analyzing the obtained captured image (3200). Herein, the analysis target may be a certain region where spatter stains are distributed at the crime scene. The captured image may be divided into images of a plurality of bloodstains and a background. The bloodstain image extractor 122 may divide the captured image into unit regions and define the unit regions as images of a background and a plurality of bloodstains by using the difference between color values or gray scales thereof. Among the plurality of bloodstains included in the captured image, the bloodstain image extractor 122 extracts an image of a spatter stain having characteristics of a spatter stain.

Figure 6A:
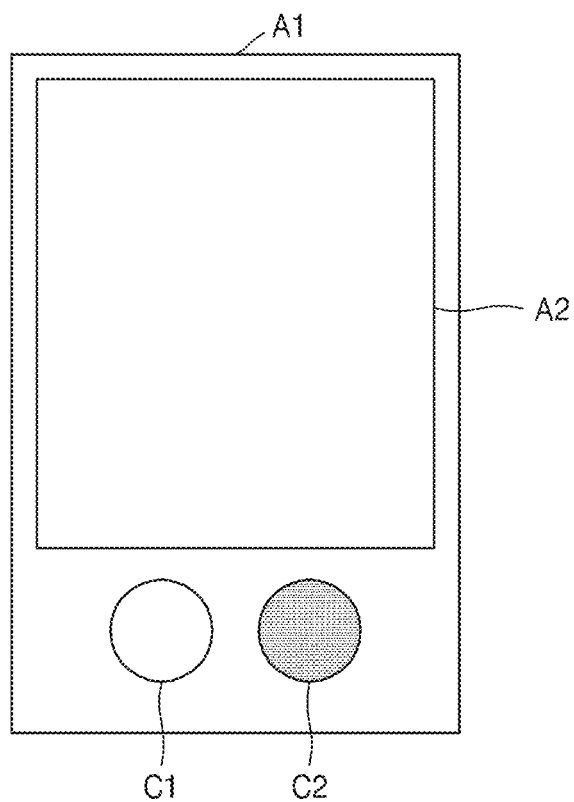
FIGS. 6A to 6F are images of examples of user interfaces provided by the electronic device.
Figure 6B:
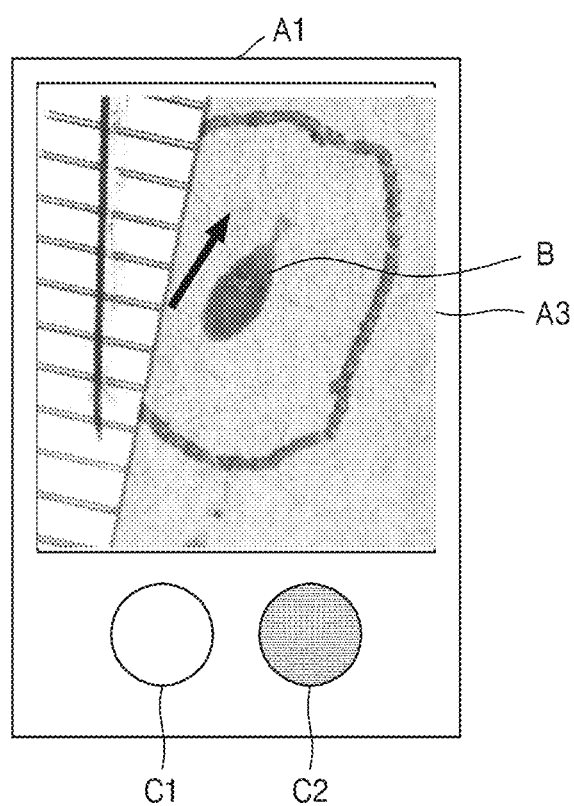
Figure 6C:
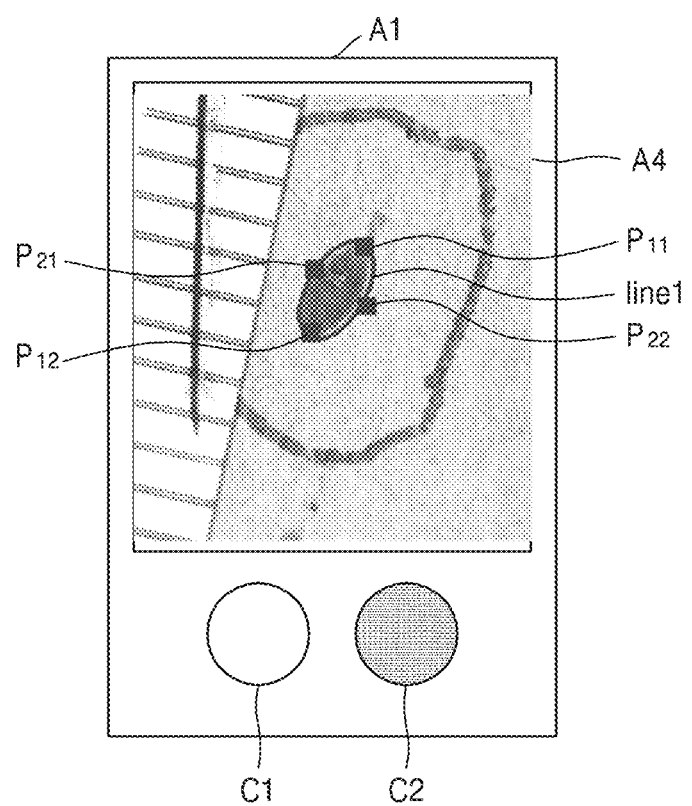
Figure 6D:
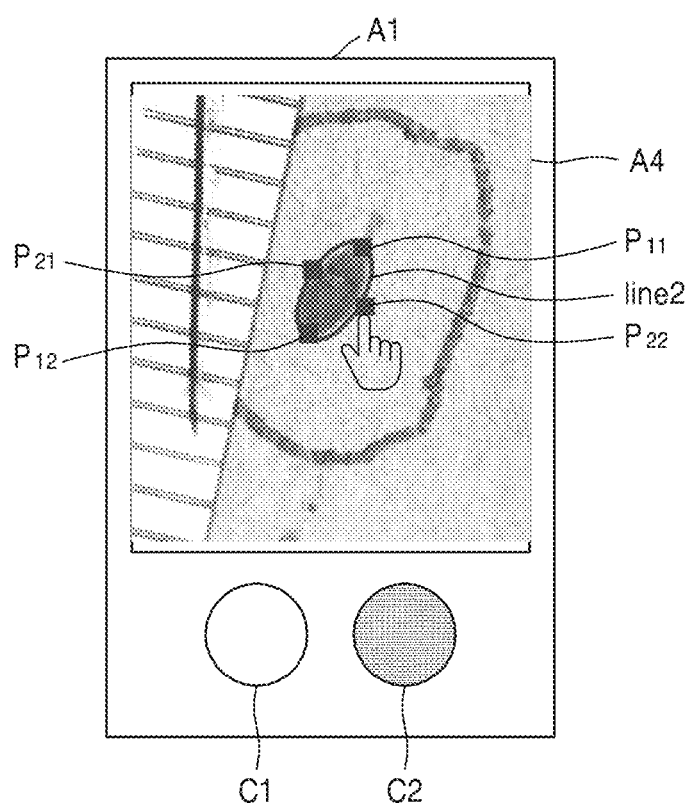
Figure 6E:
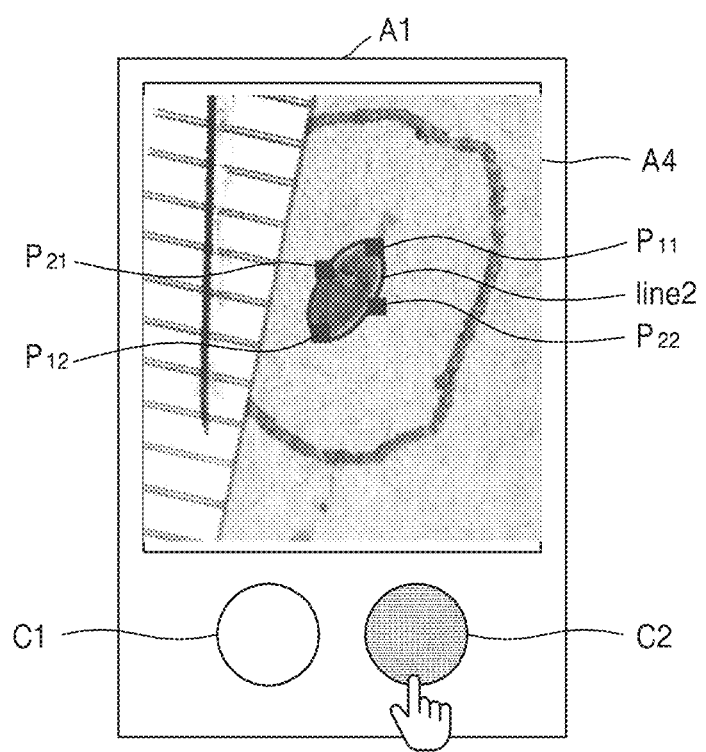
Figure 6F:
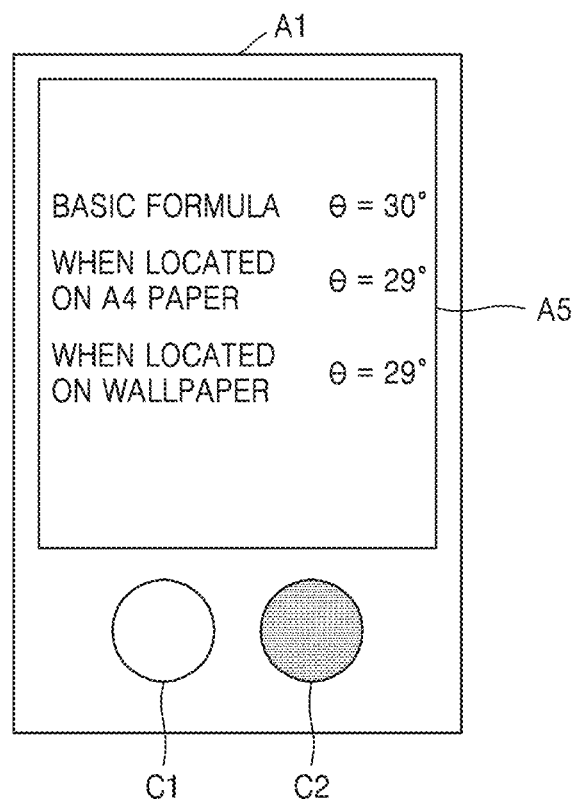

The electronic device 100 calculates a major axis length and a minor axis length of the spatter stain (S300). Referring to FIG. 4, the electronic device 100 may generate a guide line surrounding the spatter stain and having an elliptical shape (S310). In this case, the electronic device 100 may calculate a major axis length and a minor axis length by using the elliptical guide line and map the major axis length and the minor axis length of the elliptical guide line to the major axis length and the minor axis length of the spatter stain (3320). The electronic device 100 may change the location, size, shape, etc. of the guide line based on a received user input. In this case, the electronic device 100 may change the shape, size, location, etc, of the guide line based on a touch input on points distributed on the guide line. As illustrated in FIG. 6C, a guide line line1 generated by the electronic device 100 may include a first point P11 and a second point P12 corresponding to two ends of a major axis, and a third point P21 and a fourth point P22 corresponding to two ends of a minor axis. The guide line line1 may be overlaid on the captured image. As illustrated in FIG. 6D, the size of a guide line line2 may be changed based on a touch input on one of first to fourth points.

The electronic device 100 may estimate an angle of impact of the spatter stain by using the major axis length and the minor axis length of the spatter stain (S400). The electronic device 100 may calculate the angle of impact of the spatter stain based on a trigonometric function value representing a ratio of the major axis length and the minor axis length of the spatter stain. The electronic device 100 may differently apply a relational expression between the ratio of the major axis length to the minor axis length of the spatter stain and the angle of impact of the spatter stain, considering the type of a surface.

The electronic device 100 may estimate the angle of impact of the spatter stain by substituting a ratio value of the major axis length to the minor axis length of the spatter stain, in the following equation.

$$\theta = \arcsin(W/L)$$

Herein, θ denotes the angle of impact, W denotes the minor axis length, and L denotes the major axis length.

The electronic device 100 may estimate the angle of impact of the spatter stain by using one of the following equations depending on the type of the surface on which the spatter stain is located.

When the spatter stain is located on A4 paper, the electronic device 100 may estimate the angle of impact of the spatter stain by using the following equations.

$$W/L = K1 * \sin(K2 * \theta - K3)$$

$$\theta = 1/K2 * \{\arcsin(W/(L*K1)) + K3\}$$

Herein, K1, K2, and K3 denote constants. K1 may be a real number equal to or greater than 1.5 and equal to or less than 1.6, K2 may be a real number equal to or greater than 0.0095 and equal to or less than 0.0096, and K3 may be a real number equal to or greater than 0.028 and equal to or less than 0.029. Based on a test calculation, K1 may be 1.590, K2 may be 0.009517, and K3 may be 0.02877.

When the spatter stain is located on wallpaper, the electronic device 100 may estimate the angle of impact of the spatter stain by using the following equation.

$$W/L = L1 * \sin(L2 * \theta + L3) + L4 * \sin(L5 * \theta + L6)$$

Herein, L1, L2, L3, L4, L5, and L6 denote constants. L1 may be a real number equal to or greater than 0.9 and equal to or less than 1, L2 may be a real number equal to or greater than 0.02 and equal to or less than 0.03, and L3 may be a real number equal to or greater than 0.6 and equal to or less than 0.7. L4 may be a real number equal to or greater than 0.56 and equal to or less than 0.57, L5 may be a real number equal to or greater than 0.04 and equal to or less than 0.05, and L6 may be a real number equal to or greater than 3.9 and equal to or less than 4.0. Based on a test calculation, L1 may be 0.9145, L2 may be 0.02619, L3 may be 0.6478, L4 may be 0.5629, L5 may be 0.04441, and L6 may be 3.9020.

The electronic device 100 may provide an output page for outputting the image of the spatter stain and the angle of impact of the spatter stain (S500).

Referring to FIG. 5, after the angle of impact of the spatter stain is estimated by using the major axis length and the minor axis length of the spatter stain (S400), the electronic device 100 for calculating the angle of impact of the spatter stain may transmit the estimated angle of impact of the spatter stain to an external device (S410). The electronic device 100 may store the angle of impact of the spatter stain in association with a crime corresponding to the spatter stain (S420).

FIGS. 6A to 6F are images of examples of user interfaces provided by the electronic device 100.

According to embodiments of the present disclosure, when an installed program is executed, the electronic device 100 provides a screen image A1 including a preview image A2 showing a currently sensed image frame, a capture button C1, and a calculate button C2 through the output unit 150.

A current image frame is captured when a user touches the capture button C1 and calculation of an angle of impact of a spatter stain B included in the captured image is started when the user touches the calculate button C2. When a certain time has passed after the calculate button C2 is touched, the angle of impact of the spatter stain is output.

After the capture button C1 is touched, the guide line line1 surrounding the spatter stain and having an elliptical shape may be overlaid on the captured image. The guide line line1 may include the first point P11 and the second point P12 corresponding to two ends of a major axis, and the third point P21 and the fourth point P22 corresponding to two ends of a minor axis.

As illustrated in FIGS. 6C and 6D, when a touch input on the guide line is received, the size and shape of the guide line may be changed, for example, from line1 to line2.

After the calculate button C2 is touched, the electronic device 100 may set the length between the first point P11 and the second point P12 as the major axis length L, and set the length between the third point P21 and the fourth point P22 as the minor axis length W. The electronic device 100 estimates the angle of impact of the spatter stain by substituting the major axis length L and the minor axis length W in an equation determined depending on the type of a surface.

In another embodiment, the angle of impact of the spatter stain may be determined by applying a different equation depending on the type of a surface on which the spatter stain is located (e.g., wallpaper, a tile, or paper). In actual cases, since surface texture of the surface varies depending on the type of the surface, the major axis length of the spatter stain also varies.

An angle of impact of a spatter stain, which serves as a critical clue to deducing an action at a crime scene, may be calculated depending on the type of a surface, on which spatter stains are distributed, based on an electronic device for calculating an angle of impact of a spatter stain, a method of calculating an angle of impact of a spatter stain, and a computer program recorded on a recording medium to execute the method, according to embodiments of the present disclosure.

The device described above may be implemented by hardware components, software components, and/or a combination thereof. For example, the device and components described in the embodiments may be implemented using one or more general-purpose or special-purpose computers, for example, a processor, a controller, an arithmetic logic unit (ALU), a digital signal processor, a microcomputer, a field programmable gate array (FPGA), a programmable logic unit (PLU), a microprocessor, or any other device capable of executing and responding to instructions. The processing device may execute an operating system (OS) and one or more software applications running on the OS. In addition, the processing device may access, store, manipulate, process, and generate data in response to execution of the software. For ease of understanding, the processing device has been described as a single device. However, one of ordinary skill in the art will understand that the processing device may include multiple processing elements and/or multiple types of processing elements. For example, the processing device may include multiple processors or a processor and a controller. Other processing configurations, such as parallel processors, are also possible.

The software may include computer programs, code, instructions, or a combination thereof and may configure the processing device to operate as desired or instruct the processing device independently or collectively. In order to be interpreted by the processing device or to provide instructions or data to the processing device, the software and/or data may be embodied permanently or temporarily in any type of a machine, a component, a physical device, virtual equipment, a computer storage medium or device, or a transmission signal wave. The software may be distributed over a network-coupled computer system and stored or executed in a distributed fashion. The software and data may be stored in one or more computer-readable recording media.

The method according to the embodiments may be implemented in the form of program instructions that can be executed through various computer means and may be recorded in a computer-readable recording medium. The computer-readable recording medium can store program instructions, data files, data structures, or combinations thereof. The program instructions recorded in the medium may be those specially designed and constructed for the purposes of the embodiments, or they may be of the kind well known and available to one of ordinary skill in the art of computer software. Examples of the computer-readable recording media include magnetic media (e.g., hard disks, floppy disks, and magnetic tapes), optical media (e.g., CD-ROMs or DVD), magneto-optical media (e.g., floptical disks), and hardware devices (e.g., ROMs, RAMs, or flash memories, etc.) that are specially configured to store and execute program instructions. Examples of the program instructions include both machine code, such as produced by a compiler, and high-level language code that may be executed by the computer using an interpreter. The hardware devices may be configured to operate as one or more software modules to perform operations of the embodiments, and vice versa.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the disclosure as defined by the following claims.

What is claimed is:

1. A method of calculating an angle of impact of a bloodstain, the method performed by at least one processor of an electronic device and comprising:
    obtaining a captured image of an analysis target by using a camera;
    extracting a spatter stain comprised in the analysis target, by analyzing the obtained captured image;
    calculating a major axis length and a minor axis length of the spatter stain;
    estimating an angle of impact of the spatter stain by using the major axis length and the minor axis length of the spatter stain; and
    outputting the spatter stain and the angle of impact of the spatter stain,
    wherein the estimating of the angle of impact of the spatter stain comprises:
        calculating a ratio k of the major axis length to the minor axis length of the spatter stain;
        determining an equation to be applied, considering a type of a surface on which the spatter stain is located, the equation being $K=1.590 \sin(0.009517a-0.02877)$ when the surface on which the spatter stain is located is paper; and
        calculating the angle of impact of the spatter stain by using the ratio k and the equation.

2. The method of claim 1, wherein the calculating of the major axis length and the minor axis length of the spatter stain comprises:
    generating a guide line surrounding the spatter stain and having an elliptical shape; and
    calculating a major axis length and a minor axis length of the guide line and mapping the major axis length and the minor axis length of the guide line to the major axis length and the minor axis length of the spatter stain.

3. The method of claim 2, wherein the guide line surrounding the spatter stain and having an elliptical shape is output through an output unit and adjusted in location, size, or shape based on a user input.

4. The method of claim 1, wherein an angle a of impact of the spatter stain is calculated using an equation, $K=0.9145 \sin(0.02619 a+0.6478)+0.5629 \sin(0.04441 a+3.9020)$ when the surface on which the spatter stain is located is wallpaper.

5. The method of claim 1, wherein the at least one processor comprises a first button used to obtain the captured image and a second button used to calculate the angle of impact of the spatter stain.

6. The method of claim 1, wherein the obtaining of the captured image of the analysis target comprises obtaining a captured image from an external imaging device.

7. The method of claim 1, further comprising transmitting the captured image and the angle of impact of the spatter stain to an external device, after the angle of impact of the spatter stain is estimated.

8. An electronic device comprising a camera, an input unit, an output unit, at least one processor, and a storage medium having stored therein instructions executable by the at least one processor, wherein the at least one processor is configured to:
    obtain a captured image of an analysis target by using the camera;
    extract a spatter stain comprised in the analysis target, by analyzing the obtained captured image;
    calculate a major axis length and a minor axis length of the spatter stain;
    estimate an angle of impact of the spatter stain by using the major axis length and the minor axis length of the spatter stain; and
    output the spatter stain and the angle of impact of the spatter stain through the output unit,
    wherein the at least one processor is further configured to:
        calculate a ratio k of the major axis length to the minor axis length of the spatter stain;
        determine an equation to be applied, considering a type of a surface on which the spatter stain is located, the equation being $K=1.590 \sin(0.009517a-0.02877)$ when the surface on which the spatter stain is located is paper; and
        calculate the angle of impact of the spatter stain by using the ratio k and the equation.

9. The electronic device of claim 8, wherein the at least one processor is further configured to:
    generate a guide line surrounding the spatter stain and having an elliptical shape; and
    calculate a major axis length and a minor axis length of the guide line and mapping the major axis length and the minor axis length of the guide line to the major axis length and the minor axis length of the spatter stain.

10. The electronic device of claim 9, wherein the guide line surrounding the spatter stain and having an elliptical shape is output through the output unit and adjusted in location, size, or shape based on a user input received through the input unit.

11. The electronic device of claim 8, wherein the at least one processor is further configured to calculate an angle a of impact of the spatter stain by using an equation, $K=0.9145 \sin(0.02619 a+0.6478)+0.5629 \sin(0.04441 a+3.9020)$ when the surface on which the spatter stain is located is wallpaper.

12. The electronic device of claim 8, wherein the electronic device comprises a first button used to obtain the captured image and a second button used to calculate the angle of impact of the spatter stain.

13. The electronic device of claim 8, wherein the electronic device obtains a captured image from an external imaging device and estimates the angle of impact of the spatter stain comprised in the captured image.

14. The electronic device of claim 8, further comprising a communication unit configured to transmit the captured image and the angle of impact of the spatter stain to an external device.

* * * * *